Jan. 21, 1936. H. STEINBACH 2,028,255

SELF FERTILIZING FLOWERPOT

Filed Aug. 23, 1934

INVENTOR
Harry Steinbach
BY
ATTORNEY

Patented Jan. 21, 1936

2,028,255

UNITED STATES PATENT OFFICE 2,028,255

SELF-FERTILIZING FLOWERPOT

Harry Steinbach, Sunnyside, N. Y., assignor to Rex Beach, New York, N. Y.

Application August 23, 1934, Serial No. 741,025

3 Claims. (Cl. 47—38)

The present invention relates to self-fertilizing flower pots and is more particularly directed toward the provision of a flower pot, jardinière or the like with a supply of fertilizer adequate to maintain proper growth of the plant to be placed therein. By thus providing the flower pot with the supply of fertilizer, one can be assured that the point will be properly fertilized. The fertilizer is carried by the pot in such a way as to be wetted by the moisture in the soil carried in the pot. The fertilizer is slowly dissolved by this moisture and spread through the soil so that the plant is able to readily obtain the plant food.

The accompanying drawing shows for purposes of illustrating the present invention several of the many possible embodiments in which the invention may take form, it being understood that the drawing is illustrative of the invention rather than limiting the same. In the drawing.

Figure 1:
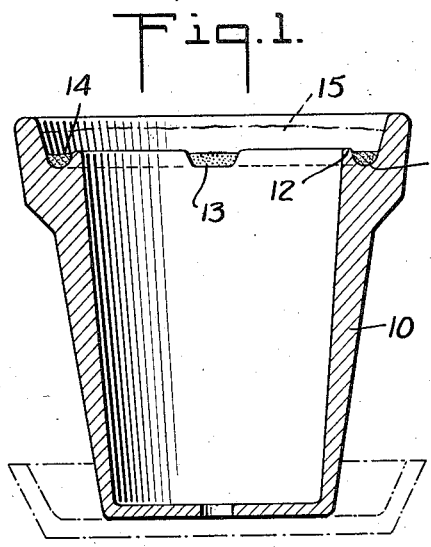
Fig. 1 is a vertical sectional view through a flower pot showing the fertilizing material carried in a depression near the top of the pot.

In Figure 1 a flower pot of conventional shape is indicated at 10. Near the upper open end of the flower pot there is provided an annular recess 11. It is here shown as being carried in a shelf 12 spaced some distance below the upper edge of the pot so as to be covered by the soil in the pot. Drainage from the recess may be provided by removing a portion of the recess wall as indicated at 13. The recess 11 is filled with fertilizing material indicated at 14. This fertilizing material may be of a powdered nature or may be in the form of a paste with some inert material which acts to hold it in place without materially interfering with its being dissolved by water in the dirt in the pot. The level of the dirt is indicated by the dotted line 15.

Figure 2:
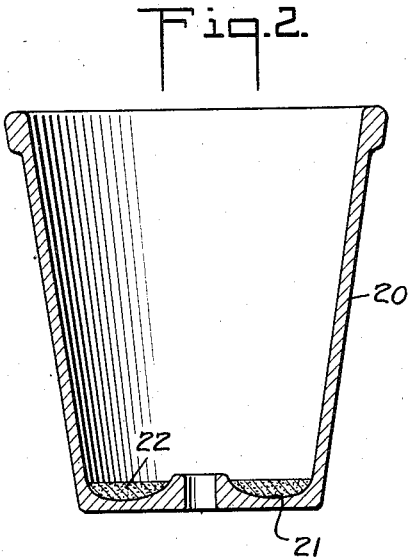
Fig. 2 is a similar view showing the fertilizing material carried in a depression in the bottom of the pot.

The pot 20 shown in Figure 2 is provided with an annular recess 21 in the bottom wall of the pot and fertilizing material 22 is placed in this recess.

Figure 3:
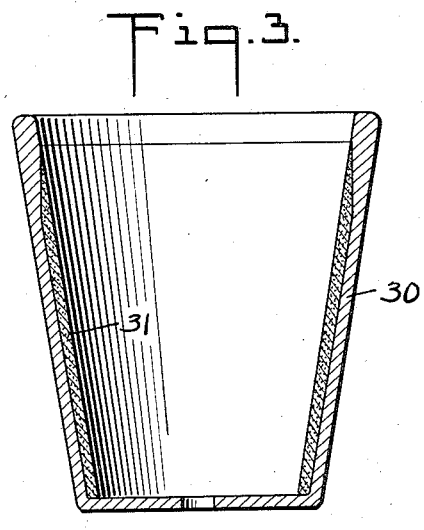
Fig. 3 is a similar view showing the fertilizing material carried at the side walls of the pot.

In the form shown in Figure 3 the side walls of the pot 30 are covered with an even coating of fertilizer indicated at 31. In this case the fertilizer is mixed with an inert porous material which adheres to the side walls of the pot.

Figure 4:
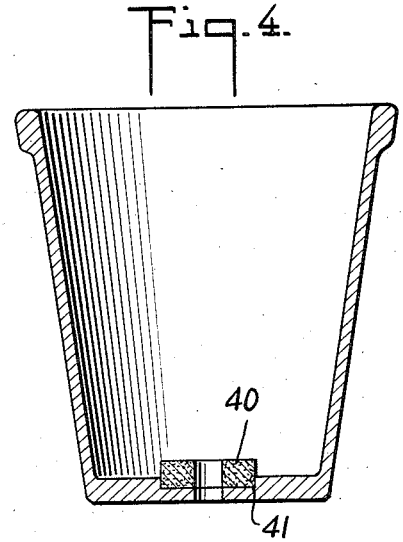
Fig. 4 is a similar view showing the fertilizing material in the form of a pellet secured in a recess in the bottom of the pot.

In the form shown in Figure 4 the fertilizing material 40 is carried in the form of a pellet which fits a reduced shoulder portion 41 in the bottom of the flower pot.

The fertilizer which forms part of the flower pot surface may be any one of the usual phosphates, nitrates or various mineral salts usually employed as a fertilizer. The invention involves the idea of a flower pot into which these mineral salts will be directly introduced and when the plant is watered these salts will be released by capillary attraction and introduced into the soil.

When flower pots, as here described, are provided with a supply of fertilizing material, adequate fertilizer may be available for the plant to be grown in the flower pot. The fertilizing material dissolves in the water which is supplied to the dirt or other form of soil in which the plant roots are placed. The dissolved fertilizer permeates the entire mass and thoroughly fertilizes the plant.

For successful plant growth, plants should be repotted in pots of increasing size. The supply of fertilizer may be regulated for the particular period of plant growth; or in cases where repotting is not necessary a type may be used (as in Fig. 1) where the fertilizer receptacle portion is sufficiently accessible to permit of the renewal of such fertilizer at desired periods.

It will be readily seen from the above description that a new article of merchandise is provided in which a flower pot generally composed of porous material will at the same time, as a self-contained unit, provide a fertilizing agent.

What is claimed is:

1. A flower pot having a fertilizer receiving recess near the upper edge of the pot, and a solid cake of soluble fertilizer in the recess adapted, when the pot is filled with soil, to be dissolved by moisture in the soil.

2. A flower pot having a fertilizer receiving recess in the bottom wall of the pot and a solid cake of soluble fertilizer in the recess adapted, when the pot is filled with soil, to be dissolved by moisture in the soil.

3. As a new article of manufacture, a flowerpot having a fertilizer-receiving recess in its interior surface and a solid cake of soluble fertilizer secured in said recess adapted, when the pot is filled with soil, to be dissolved by moisture in the soil.

HARRY STEINBACH.